United States Patent [19]
Gabriel

[11] 3,934,124
[45] Jan. 20, 1976

[54] SELF-ORGANIZING CONTROLLERS

[76] Inventor: Edwin Z. Gabriel, 318-B South St., Eatontown, N.J. 07724

[22] Filed: June 24, 1974

[21] Appl. No.: 482,152

[52] U.S. Cl. .............................................. 235/150.1
[51] Int. Cl.² ........................................... G05B 13/02
[58] Field of Search ................................. 235/150.1

[56] References Cited
UNITED STATES PATENTS
3,519,998  7/1970  Barron ............................ 235/151.1

OTHER PUBLICATIONS
"Self-organizing Control" (Parts I and II), by Barron Control Engineering, Feb. and Mar., 1968, pp. 70–74 in Feb. and 69–74 in Mar.

*Primary Examiner*—Eugene G. Botz

[57] ABSTRACT

The word self-adaptive has been used to describe the capability of human beings and machines to adjust their characteristics in accordance with a changing environment. Recently a more advanced form of self-adaptive system has been theorized and implemented called "self-organizing" controller because it performs even more like a human being. Its control action has a "dual" character. It studies the response from the system being controlled and then brings about its desired state by adjusting its own characteristics. Its performance can be somewhat likened to a blind man's actions as he attempts to follow a desired path. The controller can perform 250 or more solutions per second to make the sensed output response agree with the command signal with the desired limits. Each controller consists of a performance assessment part and a probability state variable (PSV) part. On-line biasing of the probability states of the PSV part results in the continual restructuring of the statistical control law. Information about the system's behavior is obtained from the error signal and its derivatives, while information about actions of the PSV part is obtained by monitoring its output. At the heart of the PSV part is a gaussian noise generator, which enables the system to perform cautiously, while simultaneously eliminating undesirable noise. Such a system can be described as having the ability to learn very rapidly.

The improvements in this concept and technique involve a reduction in the number of parts, the replacement of binary multipliers, with analog type multipliers and the introduction of an error squarer device to enable plants having lower frequency responses to be controlled.

This control system has the inherent capability to handle situations for which rigidly programmed systems are not particularly suited.

3 Claims, 17 Drawing Figures

PA PART  PRIOR ART
FIG. 6A

ACL PART  PRIOR ART
FIG. 9A

ACTUATION CORRELATION LOGIC PART
FIG. 9B

FIG. 10

VECTORS COMPOSING
THE PSV SIGNAL

RESPONSES FOR ERROR SIGNAL

RESPONSES - 4TH ORDER SYSTEM
WITH SAME DEAD ZONE

RESPONSES - ERROR SIGNAL SQUARED

RESPONSES - 2ND ORDER SYSTEM
DAMPING RATIO = 0.1, $\omega$ = 10 RAD/SEC.
SAME SYSTEM FOR BOTH RESPONSES

SELF-ORGANIZING CONTROLLERS

BACKGROUND OF THE INVENTION

Reference is made to Disclosure Document No. 010693 dated May 9, 1972, entitled "Study, Simulation, Design and Application of a Self-Organizing Control System to a Vehicle."

The present invention relates to a fast response self-organizing controller requiring minimum proiri information. This controller was applied to two of the six axes of a simulated high performance helicopter. The self-organizing controllers enabled the aircraft to exhibit good damping characteristics even when the helicopter equations were made nonlinear. The aircraft's loading, speed and altitude were changed over a wide range and still the aircraft exhibited good damping characteristics to large step command inputs. In no case were limit cycle oscillations observed with two controllers in the overall system. For prior art one may refer to the work performed by Roger L. Barron of Adaptronics, Inc., McLean, Va. By using analog type multipliers instead of binary multipliers, the limit cycle oscillation responses obtained using the Adaptronics controller were eliminated. The use of analog multipliers made possible and elimination of at least two crossover detectors and one limiting amplifier without sacrificing any degradation in the system's response.

The helicopter is one of the most complicated of vehicles. It is an extremely high order plant. Its body is not a perfectly elastic structure, its linkages bend, have hysteresis and dead zones. In its aerodynamics is unsteady flow phenomena associated with the rotors and wings, if any. Nonlinearities include surface rate limiting, saturation of amplifiers supplying signals from amplifiers and a little hysteresis in the control surfaces and in the hydraulic actuator valves. Cross-couplings between the actuators that drive multiple response variables provide additional nonlinearities. For the above reasons the helicopter is a good candidate for self-organizing control systems. Furthermore, the F.A.A. will grant IFR certification only to multi-engine, two-piloted helicopters with very strong stability augmentation systems (SAS) designed to duplicate airplane fixed wing flying characteristics. The self-organizing controller will provide strong stability augmentation even in conjunction with conventional SAS, if desired. The self-organizing controller will perform equally satisfactorily with or without other conventional types of control in the system. Hence, either the conventional or the self-organizing control system may serve as a backup for the other should either one fail in part or in entirety. In many industrial plant processes, in which temperature, level, flow or pressure are controlled, the rate of response is slow. By adding an error squaring circuit to the controller, slow response systems may be controlled.

Further objects and advantages of the improvements made in self-organizing controllers will become apparent from the description of the figures and claims.

DETAILED DESCRIPTION OF THE PREFERRED EMBODIMENTS

Figure 1:
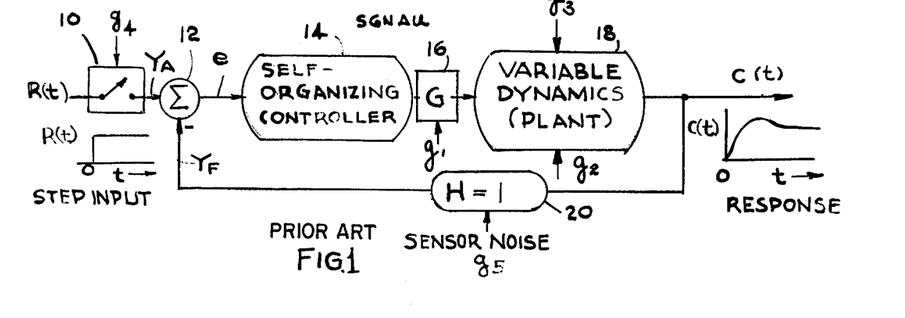
FIG. 1 is a block diagram of a single coal, single actuator self-organizing controller in a closed loop with the plant, showing the various inputs which might occur simultaneously.

Referring to FIG. 1, a block diagram of a single loop, single actuator system showing the in-line self-organizing controller and the plant it controls. The control system is evaluated with respect to:

1. Transient response to control command input $R(t)$;
2. Transient response to wind gusts, $g_3$;
3. Control system noise and stability of plant outputs.

The undesirable inputs are shown as:

1. Transmission noises, $g_4$;
2. Wind gust disburbance, $g_3$;
3. Corruption within the plant, $g_2$;
4. Actuator and sensor noise, $g_1$ and $g_5$.

The only desirable input is the command signal $R(t)$. The self-organizing controller (SOC) performs in a manner to be virtually insensitive to most of the undesirable inputs. It also is less sensitive both to control system and to plant system nonlinearities. A desirable time response to the step input $R(t)$ is shown for a typical plant output variable as $c(t)$.

In FIG. 1, the in-line controller 14 is utilized to control a typical plant 18 driven by a control signal sgn $u(t)$ which is generated by controller 14, based on the system error signal $e(t)$. The error signal may be formed by a conventional summing amplifier 12 receiving a control signal source, $Y_A$, and a feedback signal, $Y_F$, produced by sensor 20, monitoring the plant control variable $c(t)$. The control signal source may be an aircraft joy stick transmitting noise $g_4$ with the signal. Likewise actuator G, a hydraulic or an electric motor, may generate noise $g_1$. Plant 18, if an aircraft, could be disturbed either by external wind gusts $g_3$ or by internal engine vibrations $g_2$. Sensor 20 generates noise $g_5$ as a result of air frame vibrations and internal electronic component noise. The controller's purpose is to enable a plant to perform in a stable manner in the presence of noise corruptions and changing plant dynamics. These controllers are self-organizing because they can modify their own internal signal pathways as shall be pointed out in FIG. 2, in addition to being fast-learning, doing a job hundreds of times faster than a human to stabilize unstable systems in an unknown environment. This system is capable of handling and being less sensitive to:

1. A high order plant system, involving more than two integrations;
2. Nonlinear elements and components in the system;
3. Variable quantities due to environmental conditions and changes in plant configurations;
4. Noise caused by electrical, mechanical and environmental fluidic phenomena, such as is present under aircraft flight conditions;
5. Large input command signals without causing system instability.

Figure 2:
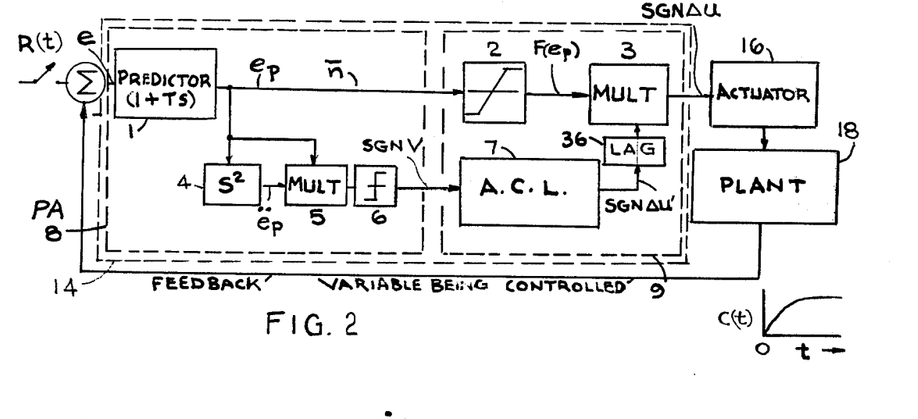
FIG. 2 is a block diagram of the controller itself showing the two parts of the system, the P.A. part and the correlation actuation part.
Figures 3, 4:
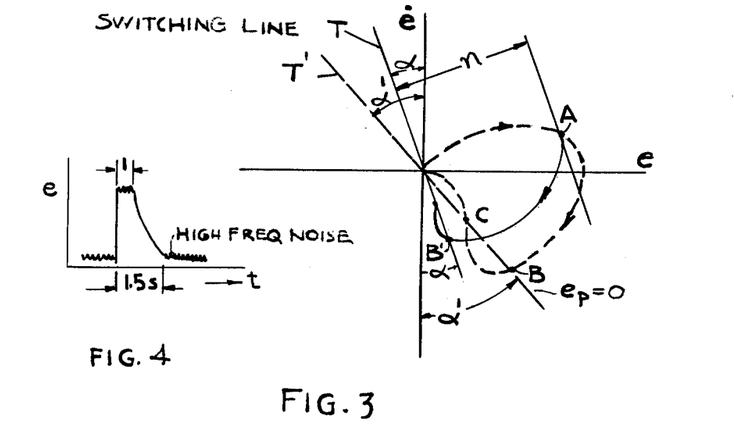
FIG. 3 is an assumed plot of error rate versus error signals, indicating the various paths the error signal can take in reducing to zero.
FIG. 4 is the error response trace obtained on a CRT screen of an oscilloscope.

FIG. 2 illustrates the two main portions of the controller 14, namely the performance assessment part 8 and the cross-correlation actuation part 9. Briefly, the controller functions to reduce error between command input and output response signals in the following manner. The predictor 1 introduces a lead signal having error plus error-rate terms. In so doing, it establishes a switching line T in the error, error-rate phase plane, shown in FIG. 3, according to the equation: $ep = (1 + Ts) e$. Signal $ep$ is positive above switching line $T$ and negative below said line. On the line it has a value of zero (0). The predictor's purpose is to avoid oscillation through anticipating the response's trend and switching polarity of the control action before the signal error changes sign. This control action is explained in a graphical manner in FIG. 4. Predictor 1, in effect, produces a damped response, the amount of damping governed in part by the predictor time constant T. Referring to FIG. 3 when a step input R(T) is applied, the error signal immediately goes to point A. From this point the controller acts to reduce error $e$. At point A, relative to switching line T, it has a plus value. In FIG. 2 for error $e$ to decrease, if previously it has increased, output of multiplier $\Delta U$ should change sign. In FIG. 3, perpendicular distance of point A from switching line T is given by "$n$" and represents the vector addition of $e$ and $Te$. If predicted error $ep$ passes switching line T, then "$n$" has changed sign. When even "$n$" changes sign, $\Delta U'$ (FIG. 2) should not change sign, (since the product of two minuses gives a plus sign), in order for the error to be decreasing. Hence, then in FIG. 2, the correlation logic should maintain polarity, and it does, when its gain devices and inverting amplifiers are designed to give the desired polarity, enabling the controller to "close in" on the origin of phase plane, FIG. 3. The sooner $ep$ reaches and stays on the switching line, the sooner the controller output will cause error $e$ to approach zero. Angle $\alpha$ of switching line, FIG. 3, should be optimized to enable this minimum time to occur. Thus in FIG. 3, the solid line represents an improvement over the dashed line for which a larger T value was used. The controller operates to produce sign reversals and gains to achieve the desired plant response. The CRT trace FIG. 4 illustrates the actual behavior of the error signal with time. Notice that the error has been reduced to zero in 1.5 seconds. The controller's output is a smoothed-over pulse-width modulated waveform with perhaps some high frequency noise superimposed thereon.

Figure 5:
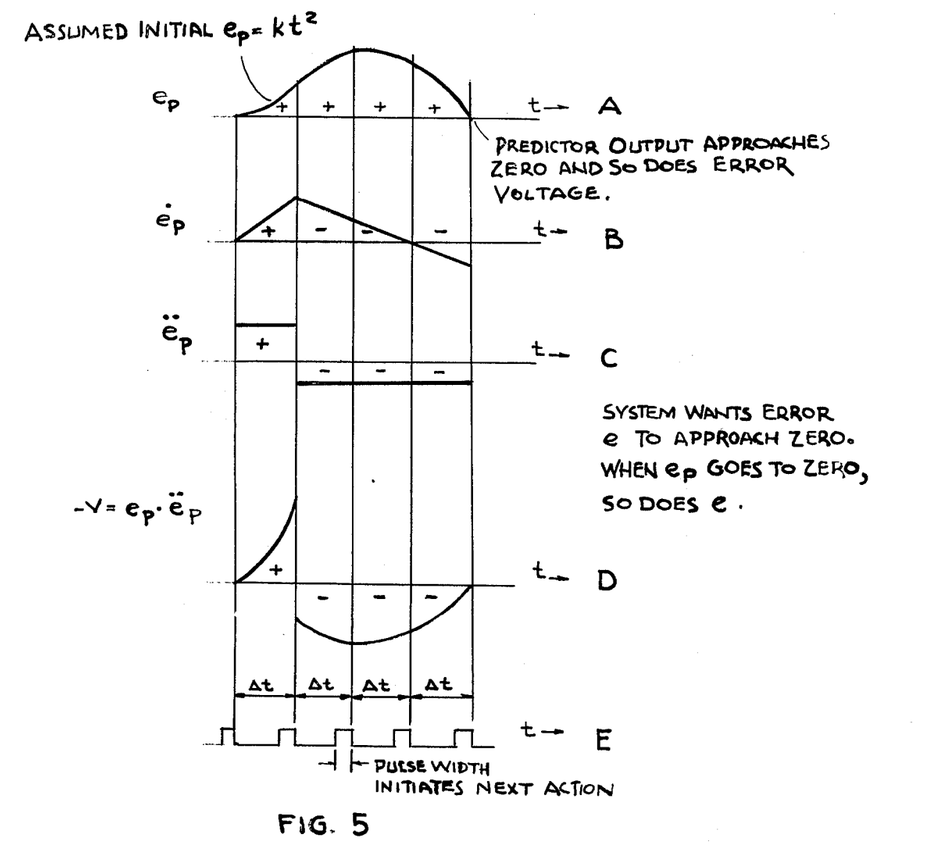
FIGS. 5A to 5D illustrate in four plotted curves how the P.A. can operate to reduce predicted error to zero.

The operation of the performance assessment part which follows explains the role of the value function $v$ to provide the proper polarity to the correlation actuation logic part. Consider the waveforms of $ep$ and its differentiations as shown in FIG. 5. Referring to FIG. 5a., assume that $ep$ is parabolically increasing for the first clock interval $\Delta t$. Differentiating this waveform once produces a ramp function, FIG. 5b. Differentiating again produces $\ddot{ep}$, a positive square waveform, FIG. 5c. The product of the two waveform segments, $ep$, and $\ddot{ep}$, produces another positive waveform $ep \cdot \ddot{ep} = v$, also parabolic in shape. Being positive, a polarity change is required in order to reduce predicted error $ep$ to 0. Thus, during the next time interval, the slope of the waveform is changed from concave to convex, FIG. 5a. Because $v$ is positive, the correlation actuation part changes the polarity of its output and, hence the plant's response correspondingly changes. Differentiating the convex waveform gives a negative ramp function, FIG. 5b. Now the second differentiation $\ddot{ep}$ also has negative polarity FIG. 5c and the product $ep \cdot \ddot{ep}$ produces a negative waveform, FIG. 5d. Since $ep$ and $\ddot{ep}$ are now of opposite sign, as required, the trend of $ep$ is continued in the next clock interval. This time predicted error $ep$ is further reduced and the differentiations are repeated producing smaller "V" values. As long as the product $ep \cdot \ddot{ep}$ has negative polarity, the trend of the $ep$ slope is continued. Note that at the end of four clock intervals, $ep$ is reduced effectively to 0. Therefore, product $ep \cdot \ddot{ep}$ also must go to zero. Once $ep$ goes to 0, the "SOC" output also must approach 0, since "$n$" approaches 0. Note in FIG. 2 that the product of $F(ep)$ and $sgn\Delta U'$ produces output $sgn\Delta U$. Controller output $sgn\Delta u$ remains at a fixed value or 0 until the input command R(t) is changed. A clock pulse from clock 33, FIG. 8, initiates each new action. In this example, note that all sign reversals in $sgn\Delta U$, FIG. 2, have been performed by value function "V", not any by "$n$", since ep has not changed sign implying that switching line T, FIG. 3, has not been crossed. For a higher order plant system, the time taken for stabilization could take longer than 4 clock intervals and also it is likely that switching line T could be crossed as shown by curved paths taken by the error signal, FIG. 3. Small non-detectable high frequency oscillations occur about the origin of the $\dot{e}$ vs $e$ plot after $ep$ approaches 0. To summarize, the performance assessment part does the following:

1. Identifies plant dynamic changes which have taken place.
2. Determines if a control action has had a desirable effect on predicted error;
3. Processes the signal into a pulse-width-modulation signal by means of zero-crossing detector 6, FIG. 2.

Figure 6A:
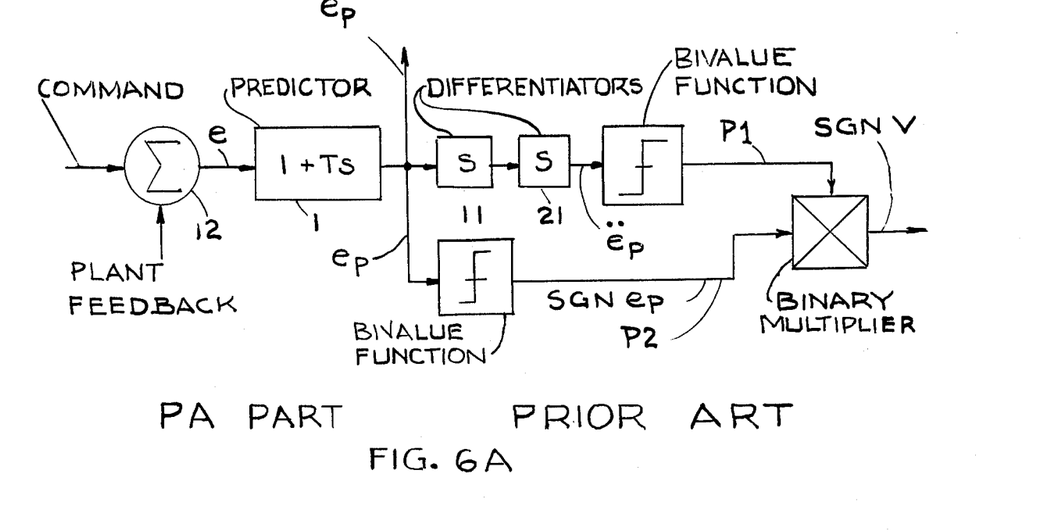
FIG. 6A illustrates the prior art PA system.
Figure 6B:
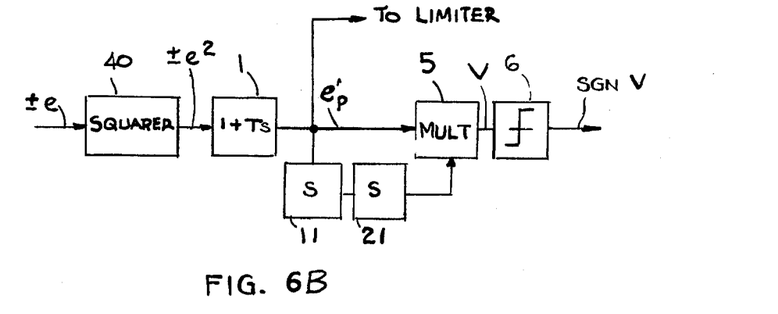
FIG. 6B illustrates the improved PA system.
Figures 7, 8:
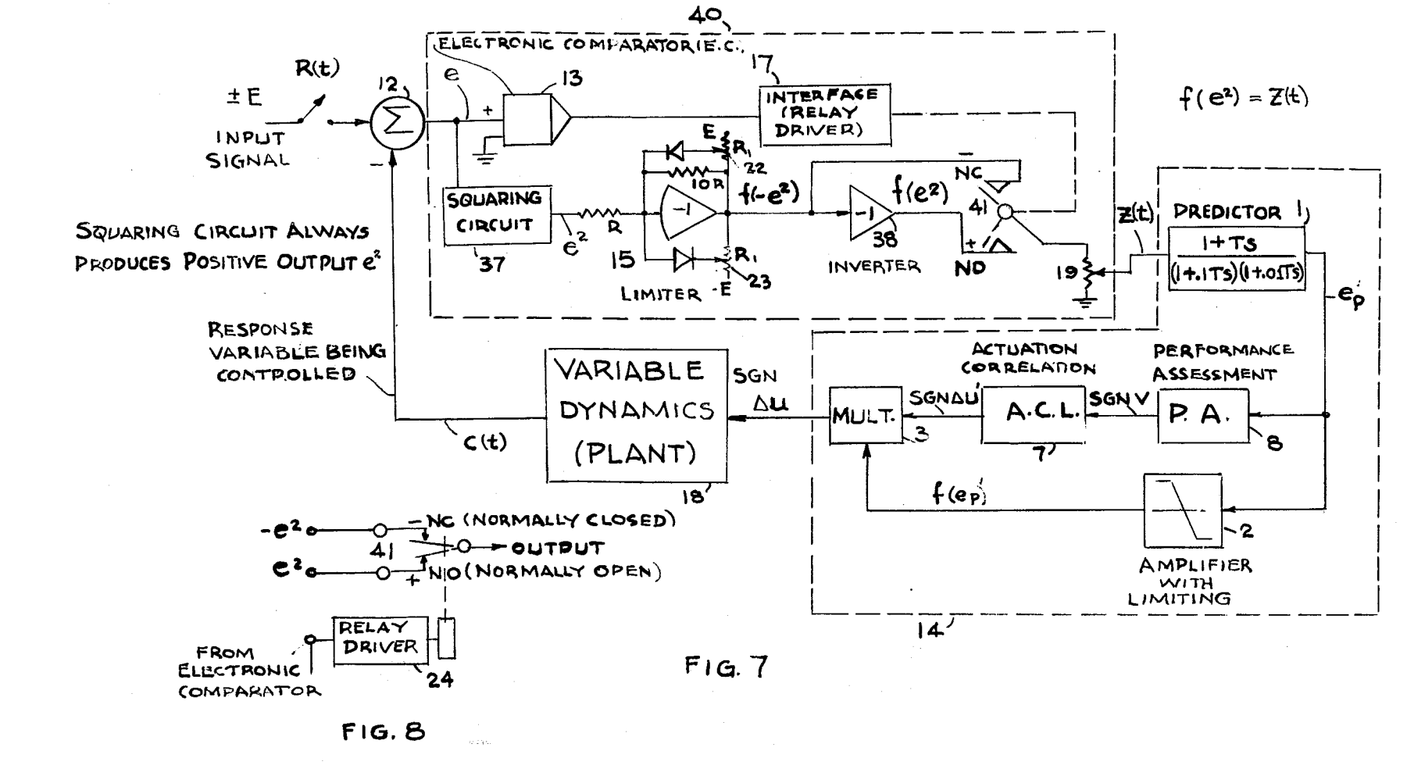
FIG. 7 is a block diagram of the error squaring function to indicate how the sign of the error may be retained following the squaring of the error.
FIG. 8 is a block diagram of the relay driver.
Figure 9A:
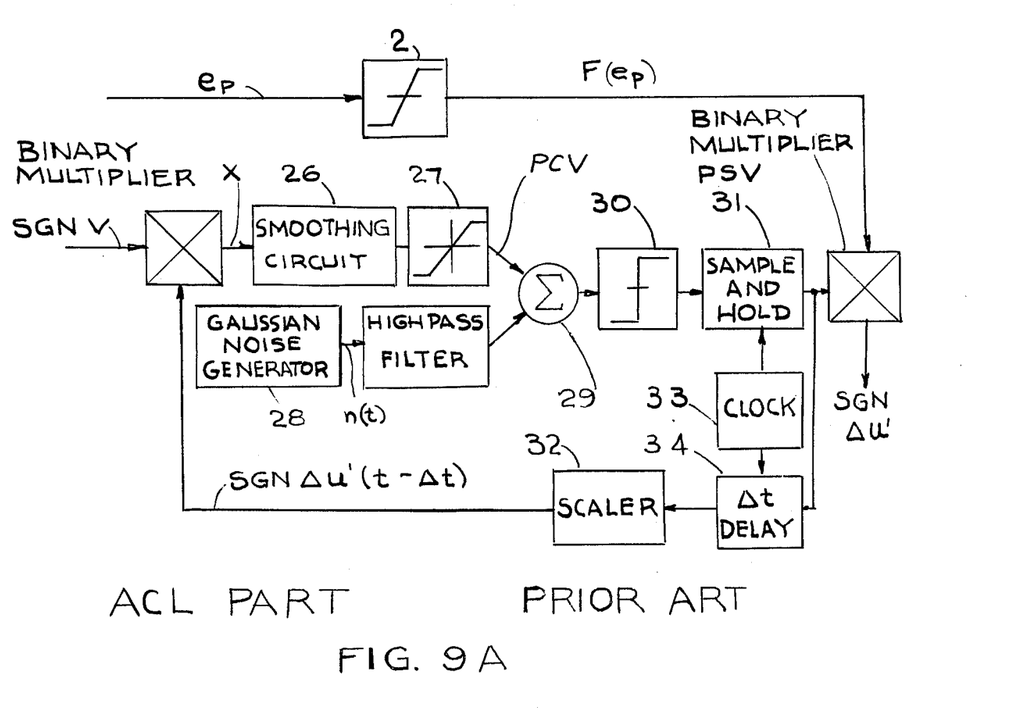
FIG. 9A illustrates the prior art PSV system.
Figure 9B:
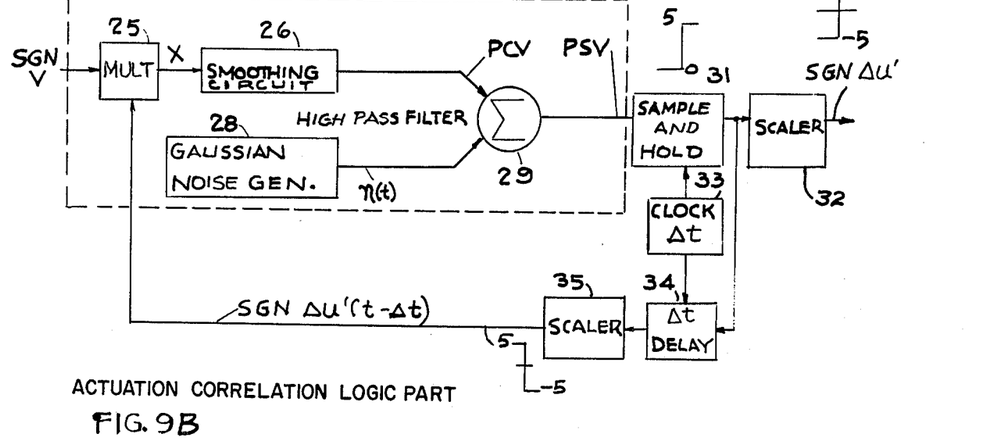
FIG. 9B illustrates the improved PSV system.

FIGS. 6A and 6B show the major portion of the performance assessment (PA) part. FIG. 6A represents prior art. As shown, a total of three stages of differentiation are performed by path P1 which includes predictor 1 and differentiators 11 and 21. A single differentiation is performed over path P2, which includes predictor 1. The binary multiplier compares the detected polarities of predicted error $ep$ and the second derivative of predicted error, $\ddot{ep}$. When both polarities are opposite, the P.A. produces a positive Sgn $v$. When both polarities are the same, the error is accelerating away from switching line T, FIG. 3, producing a negative Sgn $v$. In FIG. 6B multiplier 5 is the analog type and detector 6 converts the analog signal to pulse-width modulation. It should be noted that in other PA units, multiplier 5 is the binary type and, therefore, two zero-crossing detectors are required, in order for the output signal "V" to be pulse-width modulated. Squarer 40 squares the error signal while retaining its sign. This is desirable for low plant response frequencies, such as frequencies in the neighborhood of 1 radian per second which cannot be damped without the squaring function in the loop. The squarer increases the slope of the signal so the slope's polarity can be recognized by the performance assessment part. The circuitry of the squarer is shown in FIGS. 7 and 8. Error signal e follows two paths. In the one, "e" is applied to electronic comparator 13, which provides a positive output signal to relay driver 17 when e is positive and no signal when e is negative. Squaring circuit 37 provides $e^2$. Limiting circuit 15 is capable of amplifying the output of $e^2$ if required and also limiting the output so it will not exceed a predetermined value according to settings of potentiometers 22 and 23. Limiter's output $f(-e^2)$ applied to the NO pole of relay 41 and its inverted output $f(e^2)$ is applied to the NO pole of relay 41. Output of relay 41 may be attenuated by potentiometer 19. Let $f(\pm e^2) = Z(t)$. Signal $Z(t)$ is now applied to predictor 1. The self-organizing controller is blocked in with dashed lines. In FIG. 8 is shown relay driver 24 of interface 17. Relay driver 24 operates switch 41. FIGS. 9A and 9B show block diagrams of the actuation correlation logic (ACL) part, which includes a probability state variable portion (PSV), and may be referred to as the algorithm. As indicated, FIG. 9A represents prior art and FIG. 9B represents the improvements in the state of the art. Both diagrams are referred to in the explanation which follows. As information is acquired from the performance assessment part, this algorithm biases the polarity of future "experiments" to direct the "search" into regions of reward, corresponding to a signal which will reduce the error $e$ to 0. For a single input, single actuator system, the PSV portion is useful in stabilizing both linear and nonlinear analog higher order systems. If its input sgn V is positive, then prior control action has produced a desirable stable response trend. If sgn V is negative, an undesirable trend is indicated. Thus, negative "V" encourages continuation of the existing pattern of control action, and positive "V" prompts the controller to try different combinations in search for rewards. This ACL part is necessary for the following reasons:

1. To attenuate high frequency components, such as noise, in the signal.
2. Without the addition of the PSV portion, "hard" switching action of the zero-crossing detector would result. Soft switching characteristics are desirable to minimize ringing and limit-cycle oscillations and loss of plant stability resulting from loss of control of the plant's response signal.
3. The cross correlation part guides the search in order to reduce error $e$ to 0;
4. The cross correlation part discerns the relative magnitude and phase between the system's input and output so that the action it takes can reduce the error in the smoothest and shortest possible time;
5. The averaging of more than one sample interval is provided by the smoothing block 26, a lag circuit, so that a more conclusive measure of correlation between sgn V and sgn$\Delta$u$'(t-t)$ is indicated. Smoothing of sgn$\Delta$U$'$ also occurs following scaler 32 by another lag circuit 36, shown in FIG. 2. The lag circuit may consist of an integration amplifier with an added feedback loop having a resistor of the proper size.

Value function sgnV is multiplied by a delayed feedback signal, sgn$\Delta$U$'(t-\Delta t)$ via multiplier 25 to form product "X". This product is positive when the two signals have like polarities. The product is negative when these two signals have unlike polarities. In this way X, input to the PSV decision portion, conveys information about the cross-correlation between "V" and $\Delta$U$'(t-\Delta t)$. If "V" and $\Delta$U$'(t-\Delta t)$ are strongly correlated, then the duty cycle of "X" approaches either 0 or 100%, depending on the sense of the correlation. For a weak correlation the duty cycle of "X" will approach 50%. The interval $\Delta t$ between changes in $\Delta$U$'(t)$ should be sufficient to allow time for plant responses to become observable by the controller. FIG. 9 is a functional diagram of the PSV decision-making process. An important objective of the PSV is to attenuate signal components having higher frequencies than those needed to control a desired plant variable. In FIG. 9, the PSV portion generates a mixture of noise and a sequence of plus and minus voltages of equal magnitude. At any given time, the probability that the PSV output is positive is governed by the probability control voltage PCV being positive. To obtain a positive output, the average value of PCV and noise voltages must be positive over the frequency region in which the PCV signal exists. The noise is a balanced random function and, therefore, the PCV is the only source of bias in reaching the plus or minus voltage decision. (This bias may be obtained by averaging the input signal "X" over a number of clock signals). Limiter 27, used to reduce the magnitude of the smoothed signal in other self-organizing controllers, is actually unnecessary since both the sgn$\Delta$U$'$ and sgn V signal are already limited in magnitude by zero-crossing detectors and scalers. Similarly, zero-crossing detector 30 was found to be unnecessary since the signals from summing device 29 and detector 30 are virtually identical. Detector 30 is used in other self-organizing controllers. The sample-and-hold circuit, a bistable flip-flop circuit, filters out some of the noise while responding to bias created by the PCV signal. Clock interval $\Delta t$ generated by clock 33 governs both the duration of the delay inserted in sgn U$'(t-\Delta t)$ feedback and the moment at which the output of the summing device 29 is sampled and held until the next clock event. Note that a sample-and-hold procedure is not used with sgnV and this signal is allowed to switch from plus to minus whenever V changes polarity. The binary quantity X therefore switches with V polarity changes, unless $\Delta$U$'(t-\Delta t)$ feedback also switches, and one purpose of the smoothing filter 26 is to average the "X" signal in the presence of these possible fluctuations due to V. If $\Delta t$ is too short, meaningful information cannot be obtained via the plant/sensor feedback path to the PA part. If $\Delta t$ is too long, the duration of the ACL experiment is excessive and the plant over-responds.

Figure 10:
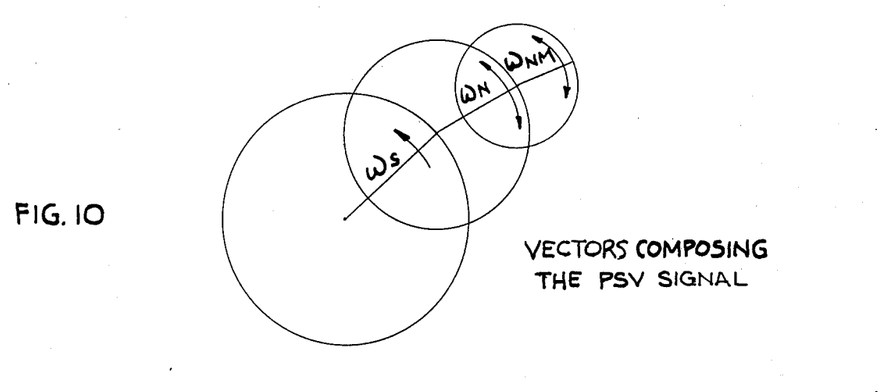
FIG. 10 is a diagram of the vectors composing the PSV subpart.

FIG. 10 is a typical diagram for the average instantaneous magnitudes and phases of the PCV signal, Ws noise $n(t)$,Wn, and modulated noise WNM frequencies at PCV. Statistically, the noise frequencies do not alter the phase of the signal frequency over many clock intervals. Therefore, the signal phase angle is not altered. The noise and signal sources are uncorrelated. Any coeherence in the PSV output is determined by the "X" signal characteristics. Thus, statistically, the PSV phase remains identical to the phase of the PCV. Because the noise signal is obtained from a relatively broad-band random noise generator, the noise value is stronger at high frequencies. If the noise signal value is high relative to the PCV signal, the low frequency signals play a less dominant role in switching the flip-flop to the desired state, and the decisions are softened. If the noise signal value is small relative to the PCV signal, the low frequency signals play a more dominant role in switching flip-flop 31. In short, the signal frequencies act as a low frequency bias on the noise. The PSV portion can be considered as a zero phase shift filter whose cut-off frequency is determined by the low end of the frequency range of the gaussian noise generator because of the presence of signal PCV, FIGS. 9A and 9B.

Figure 11A:
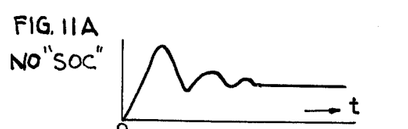
FIG. 11 shows the time response waveforms of a fourth order dynamic system with and without SOC.
Figure 11B:
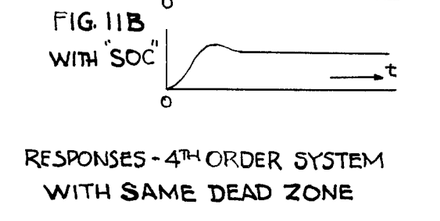

FIG. 11A represents the time response of a fourth order dynamic system with dead zone to a step input. FIG. 11B represents the time response of the identical system with the said controller in the loop. Notice the improvement in a marked reduction in undesirable oscillations. The error squarer was not in the loop.

Figure 12A:
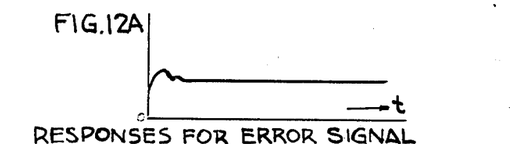
FIG. 12 shows the time response waveforms of a highly undamped second order dynamic system with and without the squaring circuit in the loop.
Figure 12B:
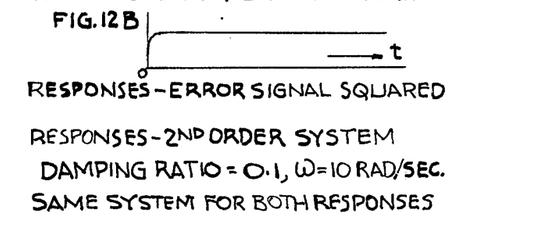

FIG. 12A shows the time response of a highly underdamped second order dynamic system having a natural frequency of 10 radians per second, with the said controller in the loop. FIG. 12B shows the time response of the identical second order system with the squaring circuit in the loop. Notice the same fast rise time but without any ascillations.

For a complicated plant, such as a helicopter, conventional feedback control systems may be combined with in-line self-organizing controllers to improve performance as well as provide backup should any part of the control system fail. With a self-organizing controller in the loop, good performance can be achieved with increased gain in the plant loop. As a consequence, faster responses, reduced sensitivity to disturbances result. Using conventional controls alone, one finds that increasing the loop gain tends to make the system responses more oscillating. Since the controller is a highly nonlinear system, defying rigorous mathematical analysis, simulation of the system was implemented on an E.A.I. analog computer with digital logic. Solutions were obtained for various inputs and environmental conditions.

SYMBOLOGY AND TERMINOLOGY SUBMITTED FOR PURPOSES OF CLARIFICATION

ACL = Actuation correlation logic
$e$ = Error signal
$e_p$ = Linear error prediction signal = $1$ = T$\dot{e}$
$\dot{e}_p$ = predicted error rate signal = $de_p/dt$
$\ddot{e}_p$ = predicted error acceleration signal = $de_p^2/dt^2$
$n$ = normal distance from system representative point in phase plane or space to the switching line or surface in the plane or space.
PA = performance assessment
PCV = probability control voltage
PSV = probability state variable unit
sgn( ) = 1 if ( ) $\geq$ 0, $-1$ if ( ) $<$ 0
$s$ = laplace complex variable and operator = $\sigma + j\omega$, where $\sigma$ = real part and $j\omega$ = imaginary part in the s-plane.
SOC = self-organizing controller
T = prediction interval (constant)
$T_1$ = time constant of smoothing circuit
$t$ = time
$\Delta t$ = interval = clock time between pulses
$\Delta t_1$ = delay time of delay circuit
$u$ = actuation logic output signal
$u'$ = correlation logic output signal
$\Delta u$ = increment in $u$
$\Delta u'$ = increment in $u'$
Actuator = electric, hydraulic or pneumatic motor
Augmented differentiator = $1 + $ T$\dot{e}$
Command signal = an input signal that is developed externally and is independent of the feedback control system.

GLOSSARY OF TERMINOLOGY SUBMITTED FOR PURPOSES OF CLARIFICATION

Constant = a quantity which remains unchanged. Its range is a single number.
Controlled variable = the quantity of the feedback system that is controlled.
Disturbance = undesirable signals that attempt to affect the value of the controlled variable.
Limiting circuit = An operational amplifier whose overall gain is reduced abruptly, changing the slope of the input-output relationship. In hard limiting, the output voltage remains constant for values of input voltage outside a given interval.
Limit cycles = the steady-state oscillations of given amplitude into which a system settles.
Plant = the system or vehicle being controlled by the actuating signal $u$.
R–S flip-flop = a bistable set-reset circuit capable of assuming two stable states, a given state depending upon the pulse history of one or more inputs and having two outputs, a normal output and an output of opposite polarity from the normal.
Regulating control signal = a signal whose purpose is to adjust the output to a desired value and regulate it against undesirable variations.
Sensor = an automatically-operated device capable of converting various types of input signals, including position, rate and acceleration, of mechanical or electrical origin into other forms and/or magnitudes.
Shift register = a circuit which will shift a binary digit either to the left or to the right for each input signal, in this case a clock pulse.
Clock = source of equally spaced pulses of $\Delta t$ interval.
Damping ratio = ratio of actual damping coefficient to the critical damping coefficient of a second order plant system, in which a critically damped system yield a response without any overshoot. In the second order equation: $s^2 + 2\delta\omega_n s + \omega_n^2$, $2\delta\omega_n$ = damping coefficient and $\delta$ = damping ratio.
E.A.I. = Electronic Associates Incorporated.

I claim:
1. In a plant controller of the type that includes:
a summing device responsive to command and feedback signals, respectively, to provide an output error signal $e$;
a predictor coupled to the output of said summing device for providing a predicted error signal $ep$ as a function of said error signal $e$;
a differentiating means coupled to the output of said predicted error signal $ep$;
first multiplier means for producing a product of said predicted error signal $ep$ and the output of said differentiated signal;
actuation correlation logic (ACL) for producing a pulse-width modulation (PWM) signal as a function of the output of said multiplier means, said PWM constituting the investigative part of a control action;
a lag circuit coupled to the output of the actuation correlation logic;
a second multiplier means responsive to lagged output of the said ACL and amplitude limited output of said predictor to produce an actuation logic output signal ($\Delta U$), whereby said ACL enables said plant controller to be insensitive to relatively high frequency noise and to be more cautious in making a polarity decision, the improvement in said plant controller that comprises:

said 1st and second multiplier means being analog multiplier means;

one input of said first multiplier means being directly coupled to the output of said predictor;

the second input of said first multiplier means being directly coupled to the output of said differentiating means; and a bivalue function means coupled between the output of said first multiplier and input of said ACL.

2. The improved plant controller as set forth in claim 1 further comprising means coupled between said summing device and said predictor and including a squarer circuit for retaining the sign of said error signal $e$, said squarer circuit enabling said plant controller to be responsive to relatively low frequency plant responses.

3. In a plant controller as set forth in claim 1, said ACL comprising:

a third multiplier means for producing a product signal (x) from the output of said first multiplier and the correlation logic output signal ($\Delta u'$) delayed by time interval $\Delta t$;

a signal smoothing circuit means coupled to the output of said third multiplier means for producing an output signal representing the mean value of said product signal $x$;

a second summing device means for adding the output signal of said smoothing means and the output of a balanced noise generator means for producing a probability state variable (PSV) signal, a sample-and-hold circuit coupled to said summing device, comprising a type R–S flip-flop having set and reset input for producing an output bivalue logic signal (sgn$\Delta U$) dependent on the state of said flip-flop, the sampling rate of said sample-and-hold circuit means being governed by the repetitive signals received from a clock pulse signal generator means;

said repetitive signals from said clock pulse signal generator means also applied to a time delay device for producing a delayed feedback signal (sgn$\Delta U'(t-\Delta t)$) to apply to one input of said third multiplier means;

the improvement in said actuation correlation logic (ACL) part that comprises:

said third multiplier means being analog multiplier means;

said summing device means receiving signals directly from said smoothing circuit means and from said noise generator means;

said sample-and-hold circuit means receiving its signal directly from said summing device means.

* * * * *

UNITED STATES PATENT OFFICE
CERTIFICATE OF CORRECTION

Patent No. 3,934,124      Dated January 20, 1976

Inventor(s) Edwin Z. Gabriel

It is certified that error appears in the above-identified patent and that said Letters Patent are hereby corrected as shown below:

Sheet 5 of 5, FIG. 9B, delete "HIGH PASS FILTER".

Column 6, line 52, after "Ws", add -- , --.

line 53, delete "WNM" and substitute -- $\omega_{NM}$, --

Signed and Sealed this

Twentieth Day of June 1978

[SEAL]

Attest:

RUTH C. MASON
*Attesting Officer*

DONALD W. BANNER
*Commissioner of Patents and Trademarks*

UNITED STATES PATENT OFFICE
CERTIFICATE OF CORRECTION

Patent No. 3,934,124      Dated January 20, 1976

Inventor(s) Edwin Z. Gabriel

It is certified that error appears in the above-identified patent and that said Letters Patent are hereby corrected as shown below:

Sheet 5 of 5, FIG. 9B, delete "HIGH PASS FILTER".

Column 3, line 68, delete "ëp" and substitute --$\ddot{e}_p$--.

Column 4, line 2, delete "ëp" and "ep.ep" and substitute --$\ddot{e}_p$-- and --$e_p \cdot \ddot{e}_p$--, respectively.

line 11, delete "ëp" and substitute --$\ddot{e}_p$--.

line 12, delete "ep.ėp" and substitute --$e_p \cdot \ddot{e}_p$--.

line 13, delete "ëp" and substitute --$\ddot{e}_p$--.

line 18, delete "ep.ėp" and substitute --$e_p \cdot \ddot{e}_p$--.

line 20, delete "ep.ëp" and subsitute --$e_p \cdot \ddot{e}_p$--.

Column 5, line 57, delete "sgn $\Delta$ u'(t- t)" and substitute --sgn $\Delta$ u'(t-$\Delta$t)--.

Column 6, line 52, after "Ws", add --,--.

line 53, delete "WNM" and substitute --,$\omega_{NM}$,--.

line 53, after "noise" add --,--.

line 54, delete "PCV" and substitute --PSV--.

Column 7, line 43, delete "1 = Tė" and substitute --e(1 + Ts)--.

UNITED STATES PATENT OFFICE
CERTIFICATE OF CORRECTION

Patent No. 3,934,124          Dated Jan. 20, 1976

Inventor(s) Edwin Z. Gabriel

It is certified that error appears in the above-identified patent and that said Letters Patent are hereby corrected as shown below:

line 68, delete "1 + T$\dot{e}$" and substitute --1 + Ts--.

In the specifications, delete each capital "V" and each capital "U" and substitute the lower case letters, as follows:

Column 3, line 34, delete "$\Delta$U" and substitute --$\Delta$u--.

line 39, delete "$\Delta$U'" and substitute --$\Delta$u'--.

Column 4, line 17, delete ""V"" and substitute --"v"--.

line 23, delete "sgn$\Delta$U'" and substitute --sgn$\Delta$u'-- line 24, delete "sgn$\Delta$U" and substitute --sgn$\Delta$u--.

line 62, delete ""V"" and substitute --"v"--.

Column 5, line 31, delete "sgn V" and substitute --sgn v --.

line 33, delete "sgn V" and substitute --sgn v --.

line 34, delete ""V"" and substitute --"v"--.

line 36, delete ""V"" and substitute --"v"--.

line 57, delete "sgn V" and substitute --sgn v--.

line 58, delete "sgn$\Delta$U'" and substitute --sgn$\Delta$u'--.

UNITED STATES PATENT OFFICE
CERTIFICATE OF CORRECTION

Patent No. 3,934,124           Dated January 20, 1976

Inventor(s) Edwin Z. Gabriel

It is certified that error appears in the above-identified patent and that said Letters Patent are hereby corrected as shown below:

line 63, delete "sgn V" and substitute --sgn v--.

line 64, delete "sgn $\Delta$U'(t-$\Delta$t)" and substitute --sgn $\Delta$u'(t-$\Delta$t)--.

Col. 6, line 1, delete ""V"" and substitute --"v"--.

line 2, delete ""V" and $\Delta$U'(t-$\Delta$t)" and substitute --"v" and $\Delta$u'(t-$\Delta$t) --.

line 7, delete "$\Delta$U'(t)" and substitute -- $\Delta$u'(t)--.

line 27, delete "sgn$\Delta$U' and sgn V" and substitute --sgn$\Delta$u' and sgn v--.

line 37, "sgn U'(t-$\Delta$t)" and substitute --sgn u'(t-$\Delta$t) --.

line 40, delete "sgn V" and substitute --sgn v ---.

line 42, delete "V" and substitute --v--.

line 43, delete "V" and substitute --v--.

line 43, delete "$\Delta$U'(t-$\Delta$t)" and substitute --$\Delta$u'(t-$\Delta$t)--.

line 46, delete "V" and substitute --v--.

In the claims delete each capital V and substitute a lower case v, as follows:

UNITED STATES PATENT OFFICE
CERTIFICATE OF CORRECTION

Patent No. 3,934,124      Dated Jan. 20, 1976

Inventor(s) Edwin Z. Gabriel

It is certified that error appears in the above-identified patent and that said Letters Patent are hereby corrected as shown below:

Column 9, line 2, delete "($\Delta U$)" and substitute --($\Delta u$)--.

Column 10, line 10, delete "(sgn $\Delta U$)" and substitute --(sgn $\Delta u$)--.

line 17, delete "(sgn $\Delta U$-" and substitute --(sgn $\Delta u$- --.

This certificate supersedes certificate issued June 20, 1978.

Signed and Sealed this

Twenty-second Day of August 1978

[SEAL]

Attest:

RUTH C. MASON
Attesting Officer

DONALD W. BANNER
Commissioner of Patents and Trademarks